(12) United States Patent
Yadav et al.

(10) Patent No.: US 11,874,747 B2
(45) Date of Patent: Jan. 16, 2024

(54) STREAM OPTIMIZED BACKUP TO CLOUD OBJECT STORE

(71) Applicant: EMC IP Holding Company LLC, Hopkinton, MA (US)

(72) Inventors: Sunil Yadav, Bangalore (IN); Amarendra Behera, Bangalore (IN); Shelesh Chopra, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 176 days.

(21) Appl. No.: 17/500,201

(22) Filed: Oct. 13, 2021

(65) Prior Publication Data
US 2023/0112207 A1    Apr. 13, 2023

(51) Int. Cl.
*G06F 11/14* (2006.01)
(52) U.S. Cl.
CPC ...... *G06F 11/1464* (2013.01); *G06F 11/1469* (2013.01); *G06F 2201/84* (2013.01)
(58) Field of Classification Search
None
See application file for complete search history.

(56) References Cited

U.S. PATENT DOCUMENTS

| | | | | |
|---|---|---|---|---|
| 8,074,043 | B1* | 12/2011 | Zeis | ............ G06F 11/1453 711/171 |
| 10,496,494 | B1* | 12/2019 | Haloi | ............ G06F 16/148 |
| 2010/0313036 | A1* | 12/2010 | Lumb | ............ G06F 3/0623 713/189 |
| 2019/0220527 | A1* | 7/2019 | Sarda | ............ G06F 3/067 |
| 2020/0145374 | A1* | 5/2020 | Sandholm | ............ H04L 63/101 |
| 2022/0283724 | A1* | 9/2022 | Malamut | ............ G06F 3/064 |

* cited by examiner

*Primary Examiner* — Eddy Cheung
(74) *Attorney, Agent, or Firm* — Chamberlain, Hrdlicka, White, Williams & Aughtry; Aly Z. Dossa

(57) ABSTRACT

A method and system for stream optimized backups to a cloud object store. When considering data protection, many prominent applications engage in backup operations by streaming their respective data to the cloud; however, the stream(s) is/are often ill-optimized (e.g., non-uniform data rates, non-uniform block sizes, different backup types, non-uniform data types or formats, etc.) to be written into cloud storage. The disclosed method and system, accordingly, propose a dynamic framework through which any arbitrary backup stream may be optimized according to the profile of any specific cloud-based object data store.

15 Claims, 6 Drawing Sheets

STREAM OPTIMIZED BACKUP TO CLOUD OBJECT STORE

BACKGROUND

When considering data protection, many prominent applications engage in backup operations by streaming their respective data to the cloud; however, the stream(s) is/are often ill-optimized (e.g., non-uniform data rates, non-uniform block sizes, different backup types, non-uniform data types or formats, etc.) to be written into cloud storage.

SUMMARY

In general, in one aspect, the invention relates to a method for protecting application database data. The method includes receiving a backup stream from an application database; partitioning the backup stream into a set of optimal-sized backup stream chunks; for each optimal-sized backup stream chunk in the set of optimal-sized backup stream chunks: generating a new object comprising a new object identifier (ID) and the optimal-sized backup stream chunk; writing the new object into an object store; generating a new object metadata store entry comprising an application database ID associated with the application database and the new object ID associated with the new object; and updating an object metadata store to include the new object metadata store entry.

In general, in one aspect, the invention relates to a non-transitory computer readable medium (CRM). The non-transitory CRM includes computer readable program code, which when executed by a computer processor, enables the computer processor to perform a method for protecting application database data. The method includes receiving a backup stream from an application database; partitioning the backup stream into a set of optimal-sized backup stream chunks; for each optimal-sized backup stream chunk in the set of optimal-sized backup stream chunks: generating a new object comprising a new object identifier (ID) and the optimal-sized backup stream chunk; writing the new object into an object store; generating a new object metadata store entry comprising an application database ID associated with the application database and the new object ID associated with the new object; and updating an object metadata store to include the new object metadata store entry.

In general, in one aspect, the invention relates to a system. The system includes an object store; and a dynamic stream processor operatively connected to the object store, and comprising an object metadata store and a computer processor configured to perform a method for protecting application database data. The method includes receiving a backup stream; partitioning the backup stream into a set of optimal-sized backup stream chunks; for each optimal-sized backup stream chunk in the set of optimal-sized backup stream chunks: generating a new object comprising a new object identifier (ID) and the optimal-sized backup stream chunk; writing the new object into the object store; generating a new object metadata store entry comprising an application database ID and the new object ID associated with the new object; and updating the object metadata store to include the new object metadata store entry.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to stream optimized backups to a cloud object store. When considering data protection, many prominent applications engage in backup operations by streaming their respective data to the cloud; however, the stream(s) is/are often ill-optimized (e.g., non-uniform data rates, non-uniform block sizes, different backup types, non-uniform data types or formats, etc.) to be written into cloud storage. The invention, accordingly, proposes a dynamic framework through which any arbitrary backup stream may be optimized according to the profile of any specific cloud-based object data store.

Figure 1:
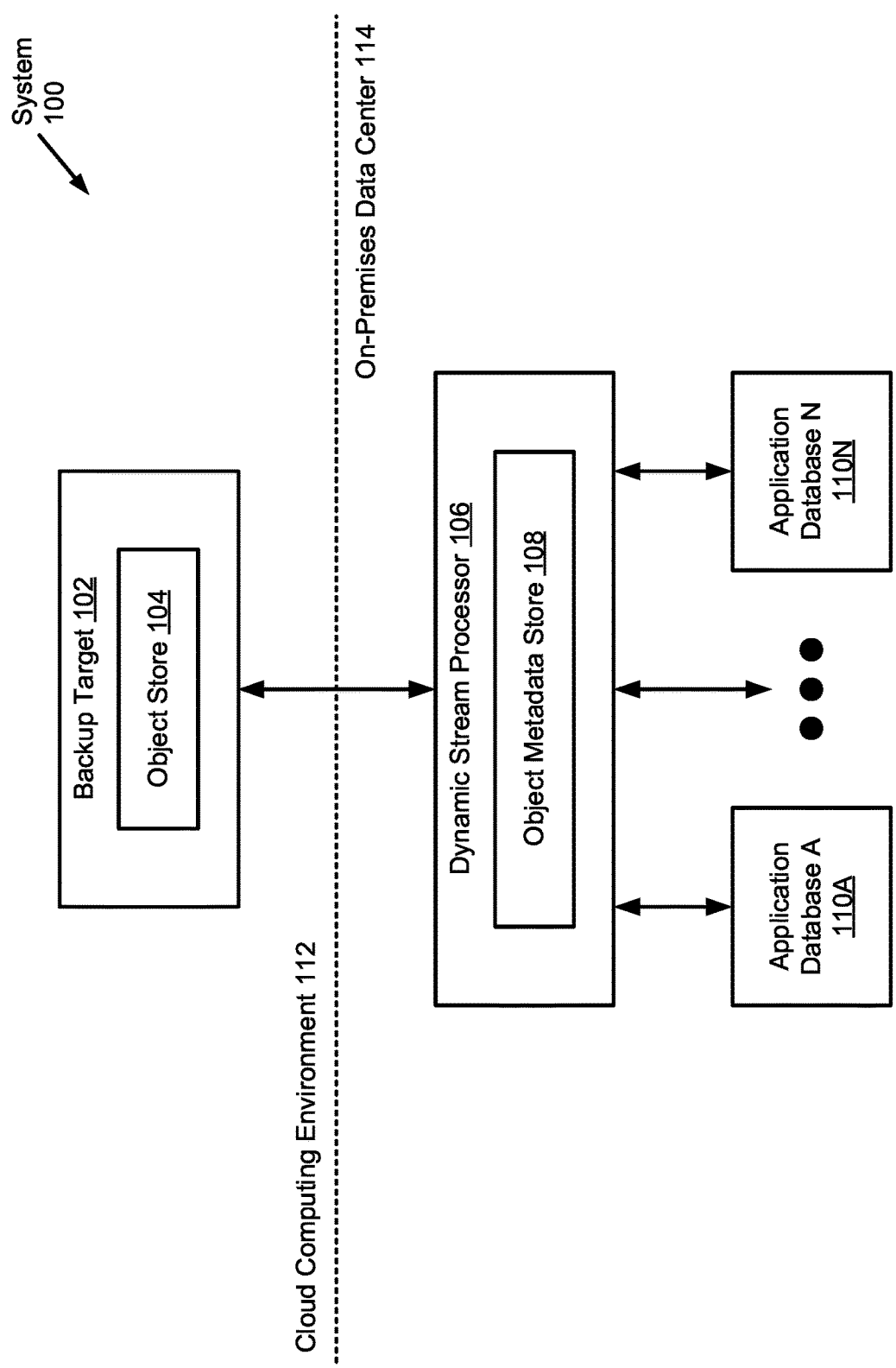
FIG. 1 shows a system in accordance with one or more embodiments of the invention.

FIG. 1 shows a system in accordance with one or more embodiments of the invention. The system (100) may include a backup target (102), a dynamic stream processor (106), and one or more application databases (110A-110N). Each of these system (100) components is described below.

In one embodiment of the invention, the backup target (102) may represent any data backup, archiving, and/or disaster recovery storage system. The backup target (102) may be implemented using one or more network servers (not shown). Each network server may encompass a physical or virtual network server, which may reside in a cloud computing environment (112) (described below). Additionally, or alternatively, the backup target (102) may be implemented using one or more computing systems similar to the exemplary computing system shown in FIG. 5.

In one embodiment of the invention, the backup target (102) may include an object store (104). The object store (104) may refer to physical storage (or logical storage occupying at least a portion of the physical storage) on the backup target (102), where any number of objects (described below) (see e.g., FIG. 2A) may be consolidated and indexed. The object store (104) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the dynamic stream processor (106) may represent any physical appliance or computing system designed and configured to manipulate streaming data at least with respect to data protection purposes. To that extent, the dynamic stream processor (106) may include functionality to: process backup streams originating from a backup source (e.g., the application database(s) (110A-110N)) (see e.g., FIG. 3); and process restore requests that lead to the generation of restore streams directed to a restoration target (e.g., the application database(s) (110A-110N)) (see e.g., FIGS. 4A and 4B). One of ordinary skill, however, will appreciate that the dynamic stream processor (106) may perform other functionalities without departing from the scope of the invention. Examples of the dynamic stream processor (106) may include, but are not limited to, a desktop computer, a laptop computer, a network server, or any other computing system similar to the exemplary computing system shown in FIG. 5.

In one embodiment of the invention, the dynamic stream processor (106) may include an object metadata store (108). The object metadata store (108) may refer to physical storage (or logical storage occupying at least a portion of the physical storage) on the dynamic stream processor (106), where object metadata descriptive of the objects, stored in the object store (104), may be consolidated and indexed. The object metadata may be organized into object metadata store entries (described below) (see e.g., FIG. 2B). Further, the object metadata store (108) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an application database (110A-110N) may represent any organized collection of structured data. The data may pertain to information generated, used, or otherwise accessible to one or more applications and/or services executing within the on-premises data center (114) (described below). Further, the data may exist in an assortment of types or formats—e.g., text, images, audio, video, multi-media, etc. An application database (110A-110N), moreover, may occupy any portion of persistent storage (not shown) available within the on-premises data center (114). Examples of persistent storage may include, but are not limited to, optical storage, magnetic storage, NAND Flash Memory, NOR Flash Memory, Magnetic Random Access memory (M-RAM), Spin Torque Magnetic RAM (ST-MRAM), Phase Change Memory (PCM), or any other storage defined as non-volatile Storage Class memory (SCM).

In one embodiment of the invention, the backup target may reside and operate within a cloud computing environment (112). The cloud computing environment (112) may refer to a virtual pool of information technology (IT) resources and/or computing services, which may be offered by third-party providers over the public Internet to multiple tenants or clients. Any given third-party provider may implement any given portion of the cloud computing environment (112) using groups of data centers that may be partitioned, through virtualization, and shared amongst the multiple tenants/clients.

In one embodiment of the invention, the dynamic stream processor (106) and the application database(s) (110A-110N) may reside and operate within an on-premises data center (114). The on-premises data center (114) may refer to any privately owned and maintained enterprise IT environment. The on-premises data center (114) may include any number and any configuration of physical network servers, network security appliances, management systems, application or service delivery controllers, routers, switches, and other known data center sub-systems.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention. For example, in one embodiment of the invention, the system (100) may include more than one backup target (not shown).

Figure 2A:
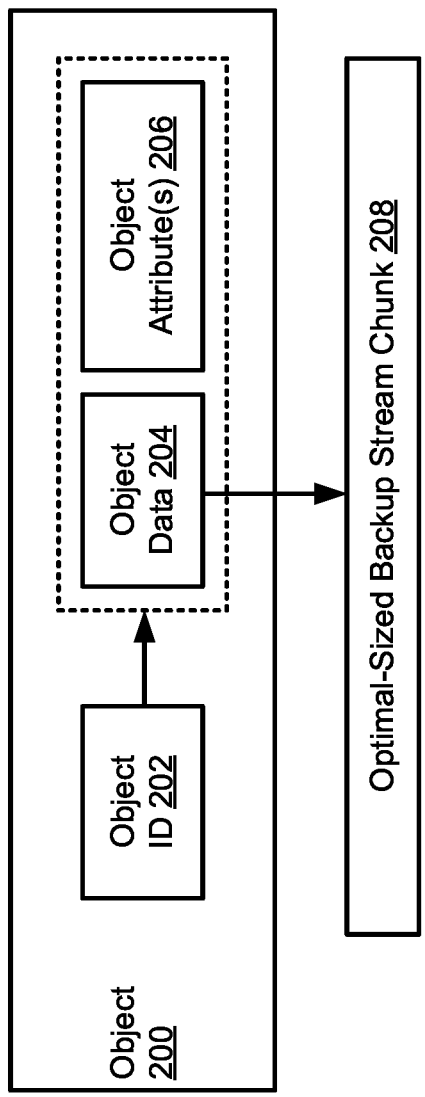
FIG. 2A shows an object in accordance with one or more embodiments of the invention.

FIG. 2A shows an object in accordance with one or more embodiments of the invention. An object (200) may refer to a uniquely identifiable, unstructured unit of data. To that extent, an object (200) may include an object identifier (ID) (202), object data (204), and zero or more object attributes (206). Each of these object (200) subcomponents is described below.

In one embodiment of the invention, the object ID (202) may refer to an arbitrary-length character string (e.g., including lower-case and/or upper case letters, numbers, symbols, or any combination thereof) that may uniquely identify the object (200).

In one embodiment of the invention, the object data (204) may refer to an optimal-sized backup stream chunk (208). An optimal-sized backup stream chunk (208) may encompass a segment or portion of a backup stream of data originating from an application database (described above) (see e.g., FIG. 1). The segment/portion of the backup stream may be of a predefined size, which would be optimal or optimized for a given profile of the cloud-based object store. A given cloud-based object store profile may refer to the service tier and/or configuration associated with the cloud-based object store. The service tier and/or configuration may specify the level(s) of resources (e.g., computer processor(s), memory, storage, graphics, virtualization, etc.) utilized to implement the cloud-based object store. Further, depending on the layout of the resources, some cloud-based object stores may be optimized to receive and store small chunk sizes, whereas other cloud-based object stores may be alternatively optimized to receive and store larger chunk sizes. Moreover, the backup stream may include one or many formats of unstructured data, such as video, audio, images, email, web pages, large sensor datasets, database files, online collaboration files, log files, archival files, or any combination thereof.

In one embodiment of the invention, an object attribute (206) (if any) may refer to metadata, or descriptive information, pertinent to the object data (204) and/or the object (200). When present, an object attribute (206) may enable collections of objects (not shown), individually addressable by their object ID (202), to be searched, filtered, and/or read in subsets without the need to know the specific object IDs. Examples of an object attribute (206) may include, but are not limited to, an object size of the object (200), access permissions for accessing the object (200), a storage tier of the object store whereon the object (200) may be stored, a stored timestamp indicating a date and/or time the object (200) had been stored in the object store, and a content format associated with the object data (204) (if known).

While FIG. 2A shows a configuration of subcomponents, other object (200) configurations may be used without departing from the scope of the invention.

Figure 2B:
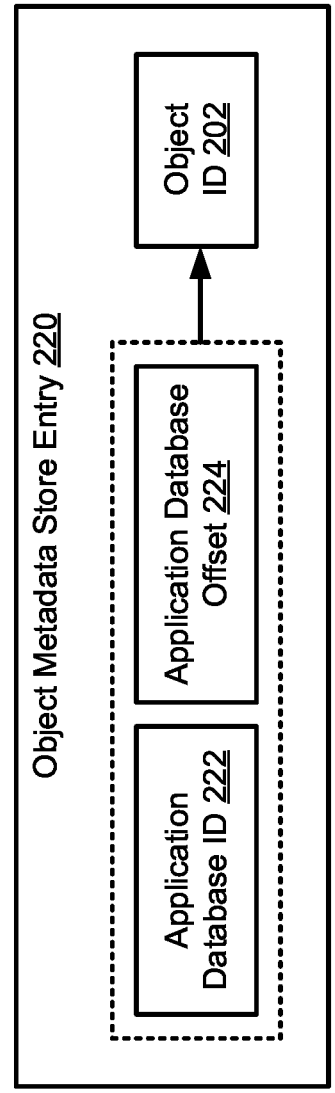
FIG. 2B shows an object metadata store entry in accordance with one or more embodiments of the invention.

FIG. 2B shows an object metadata store entry in accordance with one or more embodiments of the invention. An object metadata store entry (220) may refer to a record that may be maintained in the object metadata store (described above) (see e.g., FIG. 1). Further, an object metadata store entry (220) may exist for each object (200) consolidated in the object store (see e.g., FIG. 1) and, accordingly, may specify application database specific information particular to a given object (200). That is, an object metadata store entry (220) may include an application database ID (222), an application database offset (224), and an object ID (202) (described above) (see e.g., FIG. 2A). The former two object metadata store entry (220) subcomponents is described below.

In one embodiment of the invention, the application database ID (222) may refer to an arbitrary-length character string (e.g., including lower-case and/or upper case letters, numbers, symbols, or any combination thereof) that may uniquely identify an application database (described above) (see e.g., FIG. 1). Object data (204) contained in the object (200), associated with the object ID (202), may have originated from the identified application database.

In one embodiment of the invention, the application database offset (224) may refer to a distance or displacement (e.g., measured in bytes) from a start of an application database, or from a base storage address at which the application database may be stored in persistent storage available in an on-premises data center (described above) (see e.g., FIG. 1). The aforementioned application database may be associated with, and thus identified using, the application database ID (222). Moreover, object data (204) contained in the object (200), associated with the object ID (202), may include a segment/partition of the application database data, where said segment/partition had been stored at the indicated application database offset (224) of the application database.

While FIG. 2B shows a configuration of subcomponents, other object metadata store entry (220) configurations may be used without departing from the scope of the invention.

Figure 3:
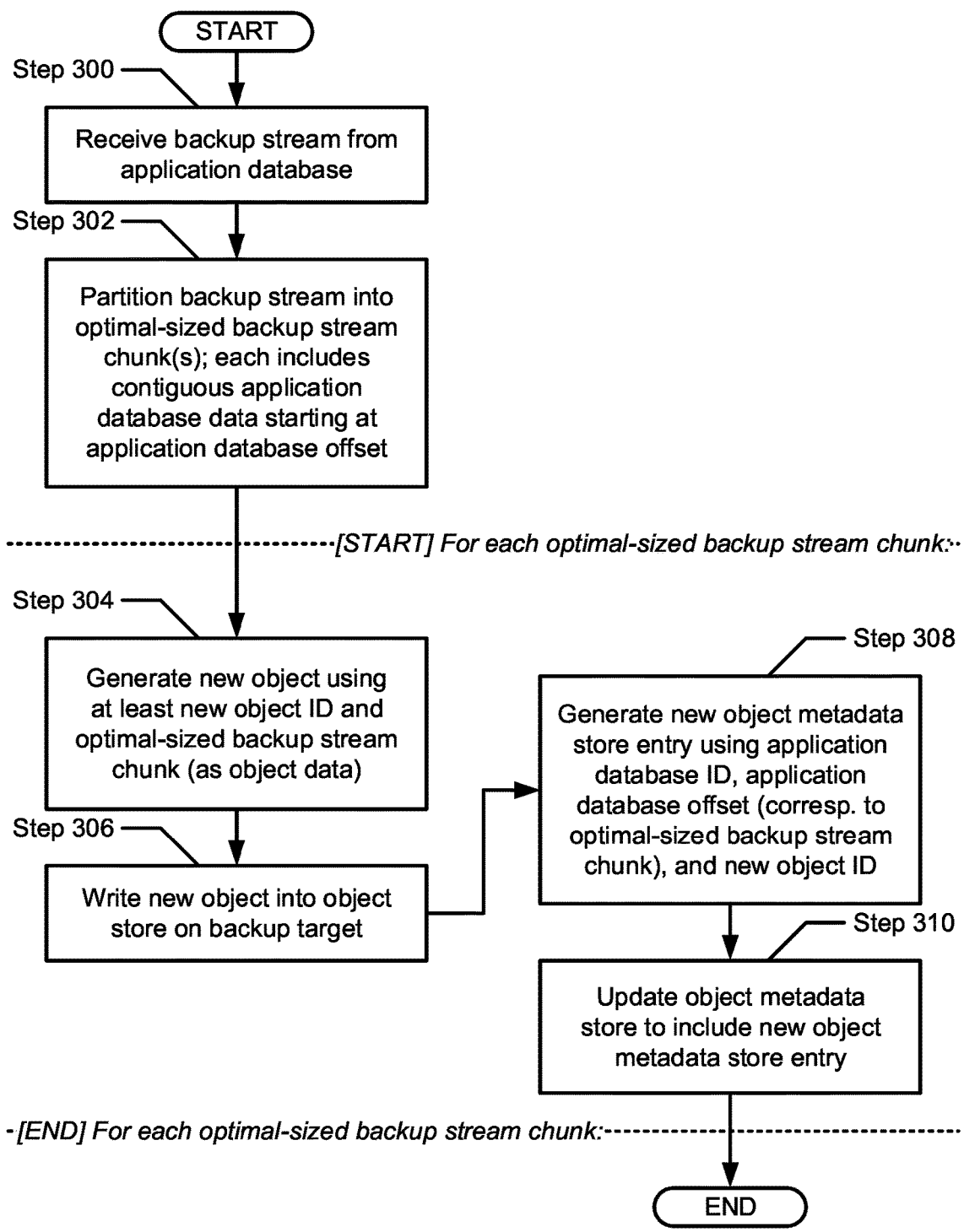
FIG. 3 shows a flowchart describing a method for processing a backup stream in accordance with one or more embodiments of the invention.

FIG. 3 shows a flowchart describing a method for processing a backup stream in accordance with one or more embodiments of the invention. The various steps outlined below may be performed by the dynamic stream processor (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a backup stream is received from an application database. In one embodiment of the invention, the backup stream may represent a stream, or a continuous flow, of digital content duplicative (e.g., for disaster recovery purposes) of at least a portion of the data retained in the application database. The backup stream may result from a backup operation currently underway, which may be targeting the application database. Further, in one embodiment, the backup stream may include all content maintained on the application database, and thus representative of a full backup copy of the application database. On the other hand, in another embodiment, the backup stream may include a portion or a subset of all content maintained on the application database, and thus representative of an incremental or differential backup copy of the application database. Metadata accompanying the backup stream may include, but is not limited to, an application database ID uniquely identifying the application database; and an application database offset (described above) (see e.g., FIG. 2B) for each block of data of the application database forming the backup stream.

In Step 302, the backup stream (received in Step 300) is partitioned into a set of optimal-sized backup stream chunks. In one embodiment of the invention, each optimal-sized backup stream chunk may be of a predefined size, which would be optimal or optimized for a given profile of the cloud-based object store. A given cloud-based object store profile may refer to the service tier and/or configuration associated with the cloud-based object store. The service tier and/or configuration may specify the level(s) of resources (e.g., computer processor(s), memory, storage, graphics, virtualization, etc.) utilized to implement the cloud-based object store. Further, depending on the layout of the resources, some cloud-based object stores may be optimized to receive and store small chunk sizes, whereas other cloud-based object stores may be alternatively optimized to receive and store larger chunk sizes. Moreover, each optimal-sized backup stream chunk may include a contiguous portion of the application database data forming the backup stream, and may be assigned the application database offset belonging to the first data block (of the application database) forming the optimal-sized backup stream chunk.

Hereinafter, the remaining steps (i.e., Steps 304 through 310) of the outlined method may be traversed iteratively for each optimal-sized backup stream chunk in the set of optimal-sized backup stream chunks (obtained in Step 302). That is, a first iteration of the remaining steps may be performed for a first optimal-sized backup stream chunk; a second iteration of the remaining steps may be performed for a second optimal-sized backup stream chunk; and so forth, including a last iteration of the remaining steps being performed for a last optimal-sized backup stream chunk. Furthermore, the optimal-sized backup stream chunk involved with a given iteration of the remaining steps may henceforth be referred to as the given optimal-sized backup stream chunk.

In Step 304, a new object is generated. In one embodiment of the invention, the new object may at least include a new object ID, which may serve to uniquely identify the new object, and the given optimal-sized backup stream chunk, which would be representative of the object data (see e.g., FIG. 2A). The new object ID may be generated deterministically or randomly. Optionally, the new object may further include one or more object attributes descriptive of the object data and/or the new object in entirety.

In Step 306, the new object (generated in Step 304) is subsequently written into the object store of the backup target (see e.g., FIG. 1). In one embodiment of the invention, writing of the new object into the object store may, for example, entail application programming interface (API) requests, which would facilitate the transfer of the new object from an on-premises data center to a cloud computing environment where the backup target may reside.

In Step 308, a new object metadata store entry is generated. In one embodiment of the invention, the new object metadata store entry may include: the application database ID associated with the application database (from whence the backup stream had been received in Step 300); the application database offset assigned to the given optimal-sized backup stream chunk (based on the first data block thereof); and the above-mentioned new object ID.

In Step 310, the object metadata store (see e.g., FIG. 1) is updated to include the new object metadata store entry (generated in Step 308).

Figure 4A:
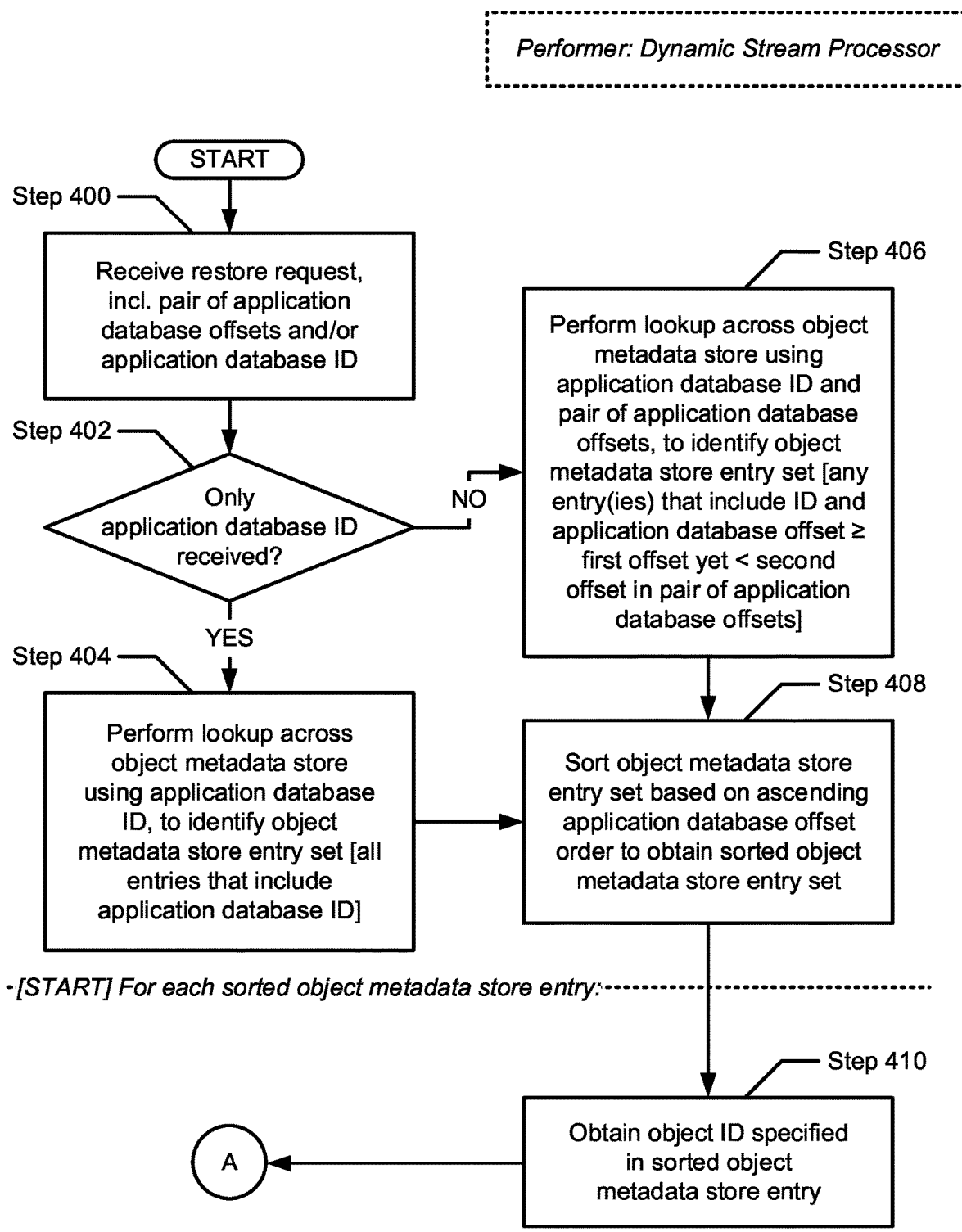
FIGS. 4A and 4B show flowcharts describing a method for processing a restore request in accordance with one or more embodiments of the invention.
Figure 4B:
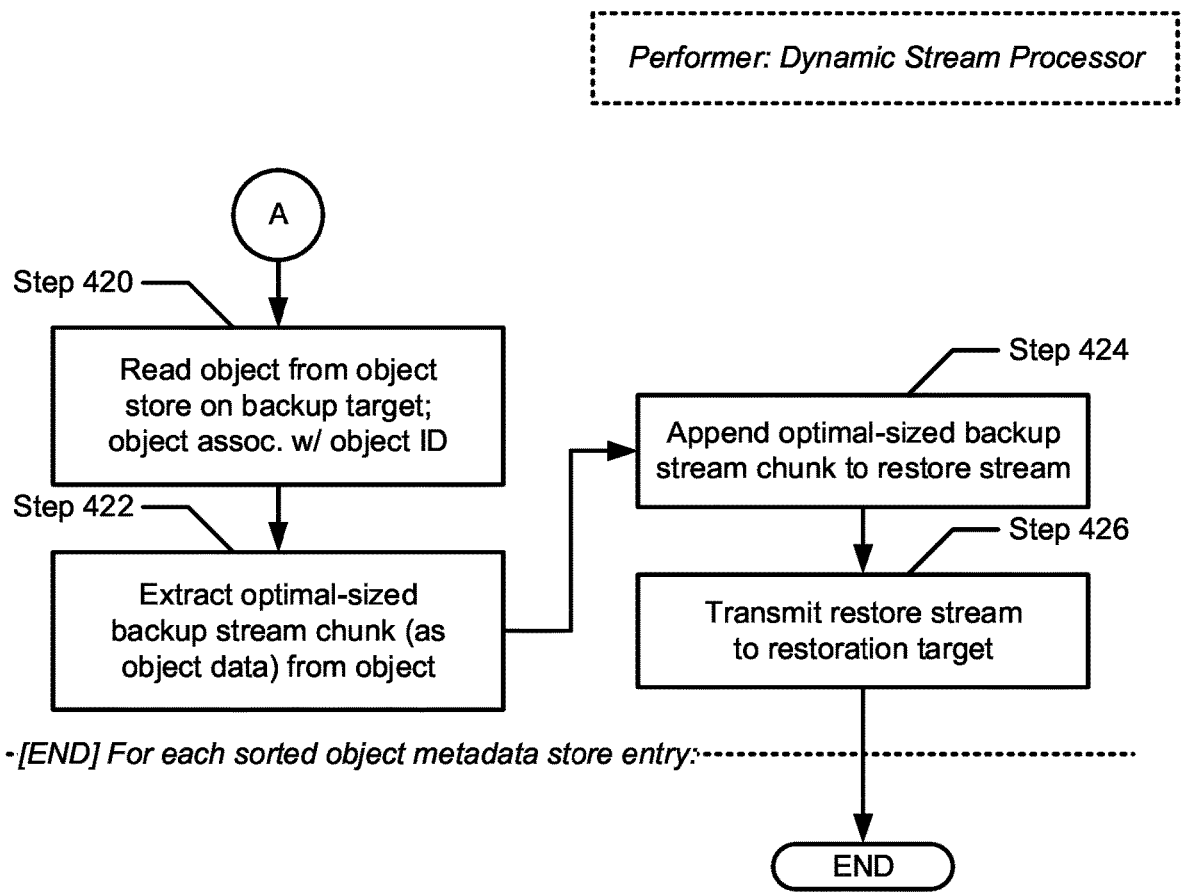

FIGS. 4A and 4B show flowcharts describing a method for processing a restore request in accordance with one or more embodiments of the invention. The various steps outlined below may be performed by the dynamic stream processor (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, a restore request is received. In one embodiment of the invention, the restore request may be submitted by or from an admin terminal within the on-premises data center, or by/from recovery software operating on an application database host (e.g., a network server, or any computing system similar to the exemplary computing system shown in FIG. 5) also within the on-premises data center. Further, the restore request may pertain to the recovery or restoration of application database data following a data loss event entailing a given application database. To that extent, the restore request may include an application database ID that may uniquely identify the given application database, and zero or a pair of application database offsets.

In Step 402, a determination is made as to whether the restore request (received in Step 400) included only an application database ID. In one embodiment of the invention, if it is determined that the restore request includes just the application database ID, then restoration of an application database in entirety may be triggered and, thus, the method proceeds to Step 404. On the other hand, in another embodiment of the invention, if it is alternatively determined that the restore request includes the application database ID, as well as two application database offsets, then restoration of a portion of an application database may be triggered and, thus, the method alternatively proceeds to Step 406.

In Step 404, following the determination (in Step 402) that the restore request (received in Step 400) only includes an application database ID, a lookup is performed across the object metadata store using the application database ID. In one embodiment of the invention, the lookup may result in the identification of an object metadata store entry set, where each identified object metadata store entry at least specifies the application database ID. Further, from here, the method proceeds to Step 408 (described below).

In Step 406, following the alternative determination (in Step 402) that the restore request (received in Step 400) includes an application database ID as well as a pair of application database offsets, a lookup is performed across the object metadata store using the application database ID and the pair of application database offsets. In one embodiment of the invention, the pair of application database offsets may include a first application database offset and a second application database offset, where the former may convey a lesser value than the latter. Accordingly, the pair of application database offsets may reference the limits of an application database offset range, which may map to data constituting a select portion of an application database. Further, the lookup may result in the identification of an object metadata store entry set, where each identified object metadata store entry specifies the application database ID and a stored application database offset (see e.g., FIG. 2B) that may be: (a) greater than or equal to the aforementioned first application database offset; and (b) less than the aforementioned second application database offset.

In Step 408, following the identification of an object metadata store entry set (in Step 404 or 406), the object metadata store entry set is sorted. Specifically, in one embodiment of the invention, an ascending application database offset order may be applied to the object metadata store entry set to obtain a sorted object metadata store entry set.

Hereinafter, the remaining steps (i.e., Steps 410 through 426) of the outlined method may be traversed iteratively for each sorted object metadata store entry in the sorted object metadata store entry set (obtained in Step 408). That is, a first iteration of the remaining steps may be performed for a first sorted object metadata store entry (which may specify a smallest application database offset value); a second iteration of the remaining steps may be performed for a sorted object metadata store entry (which may specify a second smallest application database offset value); and so forth, including a last iteration of the remaining steps being performed for a last sorted object metadata store entry (which may specify a largest application database offset value). Furthermore, the sorted object metadata store entry involved with a given iteration of the remaining steps may henceforth be referred to as the given sorted object metadata store entry.

In Step 410, an object ID, specified in the given sorted object metadata store entry, is obtained. From here, the method proceeds to Step 420 (see e.g., FIG. 4B).

Turning to FIG. 4B, in Step 420, an object is read from an object store on the backup target (see e.g., FIG. 1). Particularly, in one embodiment of the invention, the read object may be associated with, and thus uniquely identifiable via, the object ID (obtained in Step 410). Further, reading of the object from the object store may, for example, entail application programming interface (API) requests, which would facilitate the transfer of the object from an a cloud computing environment to an on-premises data center.

In Step 422, the object data (or more specifically, an optimal-sized backup stream chunk therein) is extracted from the object (read in Step 420).

In Step 424, the optimal-sized backup stream chunk (extracted in Step 422) is subsequently appended to a restore stream. In one embodiment of the invention, the restore stream may represent a stream, or a continuous flow, of digital content duplicative (e.g., for disaster recovery purposes) of at least a portion of the data that may have once been retained in an application database.

In Step 426, the restore stream is transmitted or directed to a restoration target. In one embodiment of the invention, the restoration target may be an existing application database that recently experienced a data loss event. In another embodiment of the invention, the restoration target may alternatively be a new application database.

Figure 5:
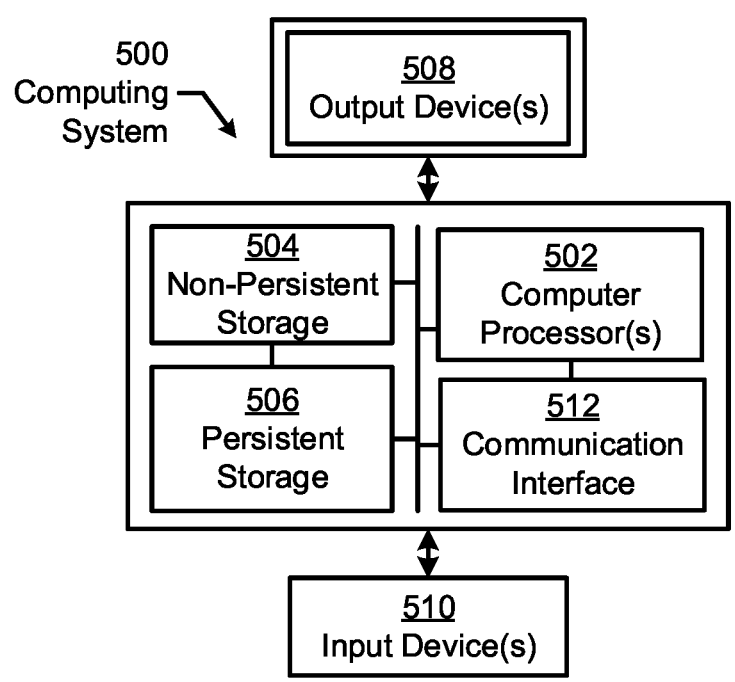
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (304), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for protecting application database data, the method comprising:
receiving a backup stream from an application database;
partitioning the backup stream into a set of optimal-sized backup stream chunks;
for each optimal-sized backup stream chunk in the set of optimal-sized backup stream chunks:
generating a new object comprising a new object identifier (ID) and the optimal-sized backup stream chunk;
writing the new object into an object store;
generating a new object metadata store entry comprising an application database ID associated with the application database and the new object ID associated with the new object; and
updating an object metadata store to include the new object metadata store entry; and
after updating the object metadata store for each optimal-sized backup stream chunk in the set of optimal-sized backup stream chunks:
receiving a restore request comprising the application database ID;
performing a lookup across the object metadata store using the application database ID to identify an object metadata store entry set;
sorting the object metadata store entry set to obtain a sorted object metadata store entry set;
for each object metadata store entry in the sorted object metadata store entry set:
obtaining an object ID from the object metadata store entry;
reading, from the object store, an object associated with the object ID;
extracting a given optimal-sized backup stream chunk from the object;
appending the given optimal-sized backup stream chunk to a restore stream; and
transmitting the restore stream to a restoration target.

2. The method of claim 1, wherein the backup stream comprises content duplicative of at least a portion of the application database data maintained in the application database.

3. The method of claim 1, wherein the optimal-sized backup stream chunk is of a predefined size deemed optimal for an object store profile of the object store.

4. The method of claim 1, wherein the new object metadata store entry further comprises an application database offset corresponding to the optimal-sized backup stream chunk.

5. The method of claim 1, wherein the object store resides in a cloud computing environment, wherein the object metadata store and the application database reside in an on-premises data center.

6. The method of claim 1, wherein each object metadata store entry in the object metadata store entry set comprises the application database ID.

7. The method of claim 1, wherein object metadata store entries in the sorted object metadata store entry set are arranged based on an ascending application database offset order.

8. A non-transitory computer readable medium (CRM) comprising computer readable program code, which when executed by a computer processor, enables the computer processor to perform a method for protecting application database data, the method comprising:
receiving a backup stream from an application database;
partitioning the backup stream into a set of optimal-sized backup stream chunks;
for each optimal-sized backup stream chunk in the set of optimal-sized backup stream chunks:
generating a new object comprising a new object identifier (ID) and the optimal-sized backup stream chunk;
writing the new object into an object store;
generating a new object metadata store entry comprising an application database ID associated with the application database and the new object ID associated with the new object; and
updating an object metadata store to include the new object metadata store entry;
after updating the object metadata store for each optimal-sized backup stream chunk in the set of optimal-sized backup stream chunks:
receiving a restore request comprising the application database ID and a pair of application database offsets;
performing a lookup across the object metadata store using the application database ID and the pair of application database offsets to identify an object metadata store entry;
sorting the object metadata store entry set to obtain a sorted object metadata store entry set;
for each object metadata store entry in the sorted object metadata store entry set:
obtaining an object ID from the object metadata store entry;
reading, from the object store, an object associated with the object ID;
extracting a given optimal-sized backup stream chunk from the object;
appending the given optimal-sized backup stream chunk to a restore stream; and
transmitting the restore stream to a restoration target.

9. The non-transitory CRM of claim 8, wherein the optimal-sized backup stream chunk is of a predefined size deemed optimal for an object store profile of the object store.

10. The non-transitory CRM of claim 8, wherein the new object metadata store entry further comprises an application database offset corresponding to the optimal-sized backup stream chunk.

11. The non-transitory CRM of claim 8, wherein each object metadata store entry in the object metadata store entry set comprises the application database ID and an application database offset, wherein the application database offset lies between the pair of application database offsets.

12. A system, comprising:
an object store; and
a dynamic stream processor operatively connected to the object store, and comprising an object metadata store and a computer processor configured to perform a method for protecting application database data, the method comprising:
receiving a backup stream;
partitioning the backup stream into a set of optimal-sized backup stream chunks;
for each optimal-sized backup stream chunk in the set of optimal-sized backup stream chunks:
generating a new object comprising a new object identifier (ID) and the optimal-sized backup stream chunk;
writing the new object into the object store;
generating a new object metadata store entry comprising an application database ID and the new object ID associated with the new object; and
updating the object metadata store to include the new object metadata store entry; and
after updating the object metadata store for each optimal-sized backup stream chunk in the set of optimal-sized backup stream chunks:
receiving a restore request comprising the application database ID;
performing a lookup across the object metadata store using the application database ID to identify an object metadata store entry set;
sorting the object metadata store entry set to obtain a sorted object metadata store entry set;
for each object metadata store entry in the sorted object metadata store entry set:
obtaining an object ID from the object metadata store entry;
reading, from the object store, an object associated with the object ID;
extracting a given optimal-sized backup stream chunk from the object;
appending the given optimal-sized backup stream chunk to a restore stream; and
transmitting the restore stream to a restoration target.

13. The system of claim 12, wherein the object store resides within a cloud computing environment.

14. The system of claim 12, further comprising:
a plurality of application databases each operatively connected to the dynamic stream processor,
wherein the dynamic stream processor receives the backup stream from an application database of the plurality of application databases, and
wherein the application database ID is associated with the application database.

15. The system of claim 14, wherein the dynamic stream processor and the plurality of application databases reside within an on-premises data center.

* * * * *